United States Patent
Kim et al.

(10) Patent No.: US 12,189,896 B2
(45) Date of Patent: Jan. 7, 2025

(54) TOUCH SENSOR AND TOUCH INPUT DEVICE COMPRISING SAME

(71) Applicant: HiDeep Inc., Seongnam-si (KR)

(72) Inventors: Seyeob Kim, Seongnam-si (KR); Bonkee Kim, Seongnam-si (KR)

(73) Assignee: HiDeep Inc.

( * ) Notice: Subject to any disclaimer, the term of this patent is extended or adjusted under 35 U.S.C. 154(b) by 0 days.

(21) Appl. No.: 18/686,458

(22) PCT Filed: Sep. 16, 2022

(86) PCT No.: PCT/KR2022/013923
§ 371 (c)(1),
(2) Date: Feb. 26, 2024

(87) PCT Pub. No.: WO2023/043281
PCT Pub. Date: Mar. 23, 2023

(65) Prior Publication Data
US 2024/0264700 A1    Aug. 8, 2024

(30) Foreign Application Priority Data
Sep. 17, 2021    (KR) .................. 10-2021-0125092

(51) Int. Cl.
*G06F 3/041* (2006.01)
*G06F 3/044* (2006.01)
(52) U.S. Cl.
CPC .......... *G06F 3/0418* (2013.01); *G06F 3/0446* (2019.05)

(58) Field of Classification Search
CPC ................ G06F 3/0418; G06F 3/0446; G06F 2203/04103; G06F 2203/04111; G06F 3/044
See application file for complete search history.

(56) References Cited

U.S. PATENT DOCUMENTS

| 10,656,742 B2 * | 5/2020 | Kim ................ G06F 3/0446 |
| 10,732,746 B2 | 8/2020 | Kim et al. |
| 10,824,269 B2 | 11/2020 | Kim et al. |

(Continued)

FOREIGN PATENT DOCUMENTS

| KR | 20180006519 A | 1/2018 |
| KR | 20180125672 A | 11/2018 |

(Continued)

OTHER PUBLICATIONS

International Search Report issued in PCT Published Application No. WO 2023/043281 (A1).

*Primary Examiner* — Amy Onyekaba
(74) *Attorney, Agent, or Firm* — The Belles Group, P.C.

(57) ABSTRACT

An embodiment of the present invention relates to a touch sensor and a touch input device comprising same. The touch sensor according to the embodiment of the present invention comprises: a plurality of driving electrodes each having a shape extending in a first direction and having a plurality of openings arranged along the first direction; and a plurality of reception electrodes comprising a plurality of reception electrode patterns arranged in the plurality of openings of the plurality of driving electrodes, and a plurality of connection patterns which are arranged along a second direction different from the first direction and electrically connect the plurality of reception electrode patterns.

14 Claims, 11 Drawing Sheets

(56) References Cited

U.S. PATENT DOCUMENTS

| | | |
|---|---|---|
| 11,182,005 B2 | 11/2021 | Kim et al. |
| 11,231,810 B2 | 1/2022 | Kim et al. |
| 11,314,363 B2 | 4/2022 | Hwang |
| 11,429,223 B2* | 8/2022 | Lee .................. G06F 3/0448 |
| 2011/0279403 A1* | 11/2011 | Lee .................. G06F 3/0443 |
| | | 345/174 |
| 2015/0185938 A1* | 7/2015 | Han .................. G06F 3/0445 |
| | | 345/173 |
| 2016/0147335 A1* | 5/2016 | Nishizawa ............ H05K 1/09 |
| | | 427/124 |
| 2018/0011598 A1 | 1/2018 | Ku et al. |
| 2018/0039358 A1* | 2/2018 | Xie .................. G06F 3/0448 |
| 2018/0329555 A1* | 11/2018 | Kim .................. G09G 3/3208 |
| 2020/0019294 A1* | 1/2020 | Lee .................. G06F 3/0448 |
| 2020/0142563 A1* | 5/2020 | Kim .................. G06F 3/0418 |
| 2020/0150826 A1* | 5/2020 | Hwang .............. G06F 3/04144 |
| 2020/0363893 A1 | 11/2020 | Kim et al. |
| 2021/0004135 A1* | 1/2021 | Kim .................. G06F 3/04182 |
| 2021/0141490 A1* | 5/2021 | Bang ................ G06F 3/0412 |
| 2021/0149517 A1* | 5/2021 | Kim .................. G06F 3/044 |
| 2021/0247886 A1* | 8/2021 | Lee .................. H10K 59/873 |
| 2022/0155895 A1 | 5/2022 | Kim et al. |
| 2022/0244803 A1* | 8/2022 | Kim .................. G06F 3/0412 |
| 2022/0413644 A1* | 12/2022 | Rhe .................. G06F 3/0445 |
| 2023/0325019 A1* | 10/2023 | Kim .................. G06F 3/0418 |
| | | 345/173 |

FOREIGN PATENT DOCUMENTS

| | | | |
|---|---|---|---|
| KR | 20200052485 A | 5/2020 |
| KR | 20200054412 A | 5/2020 |
| KR | 20210003986 A | 1/2021 |

\* cited by examiner (a)

(b)

(a)

(b)

(a)

(b)

(a)

(b)

TOUCH SENSOR AND TOUCH INPUT DEVICE COMPRISING SAME

CROSS-REFERENCE TO RELATED APPLICATIONS

This U.S. non-provisional patent application is a U.S. national stage application under 35 U.S.C. § 371 of PCT Application No. PCT/KR2022/013923, filed Sep. 16, 2022, which claims priority to Korean Patent Application No. 10-2021-0125092, filed on Sep. 17, 2021. The disclosures of the aforementioned priority applications are incorporated herein by reference in their entireties.

TECHNICAL FIELD

The present invention relates to a touch sensor and a touch input device including same.

BACKGROUND ART

Various kinds of input devices are used to operate a computing system. For example, input devices such as a button, a key, a joystick, and a touch screen are used. Since the touch screen is easily and simply operated, use of the touch screen increases when operating the computing system.

A touch sensor that is one kind of information input devices may be provided and used in a display device. For example, the touch sensor may be attached to one surface of a display panel or manufactured integrally with the display panel. A user may input information by pressing or touching the touch sensor while seeing an image displayed on a screen of the display device.

When a driving electrode and a reception electrode of the touch sensor are implemented as a single layer or a double layer, a phenomenon in which a signal that is normally detected by low ground mass (LGM) when touched in a state (floating state) in which a touch input device to which the touch sensor is mounted is not held by hands is disappeared or a signal to be detected is split and touched at two points or more may occur.

DISCLOSURE OF THE INVENTION

Technical Problem

An embodiment of the present invention provides a touch sensor capable of improving touch sensing sensitivity and a touch input device including same.

An embodiment of the present invention also provides a touch sensor capable of removing various noises generated during touch sensing and a touch input device including same.

Technical Solution

An embodiment of the present invention provides a touch sensor including: a plurality of driving electrodes each having a shape extending in a first direction and having a plurality of openings arranged along the first direction; and a plurality of reception electrodes including a plurality of reception electrode patterns arranged in the plurality of openings of the plurality of driving electrodes and a plurality of connection patterns arranged along a second direction different from the first direction to electrically connect the plurality of reception electrode patterns.

In an embodiment of the present invention, a touch input device includes a touch sensor, a driving unit, and a sensing unit. Here, the touch sensor includes: a plurality of driving electrodes each having a shape extending in a first direction and having a plurality of openings arranged along the first direction; and a plurality of reception electrodes including a plurality of reception electrode patterns arranged in the plurality of openings of the plurality of driving electrodes and a plurality of connection patterns arranged along a second direction different from the first direction to electrically connect the plurality of reception electrode patterns. Also, the driving unit provides a driving signal to the plurality of driving electrodes, and the sensing unit senses a plurality of sensing signals outputted through the plurality of connection patterns.

Advantageous Effects

When the touch sensor and the touch input device including same according to the embodiment of the present invention are used, the touch sensing sensitivity may be improved.

Also, the various noises generated during the touch sensing may be removed.

MODE FOR CARRYING OUT THE INVENTION

Figure 1:
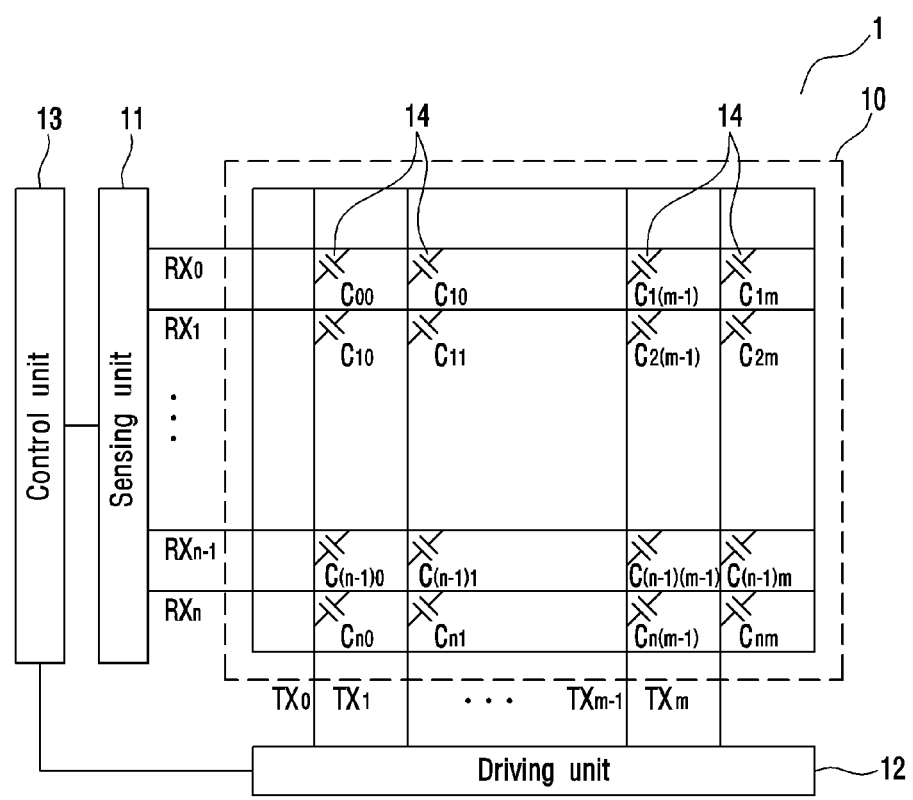
FIG. 1 is a schematic view illustrating a touch sensor and a touch input device including same according to an embodiment of the present invention.

The present invention will now be described more fully with reference to the accompanying drawings, in which exemplary embodiments of the invention are shown. These embodiments are provided so that this disclosure will be thorough and complete, and will fully convey the concept of the invention to those skilled in the art. The invention may, however, be embodied in many different forms and should not be construed as being limited to the embodiments set forth herein. Therefore, it will be understood that the embodiments disclosed in this specification includes some variations without limitations to the shapes as illustrated in the figures. Also, the position or the arrangement of each component in the embodiment may be varied without departing form the spirit or scope of the invention. The preferred embodiments should be considered in descriptive sense only and not for purposes of limitation. Therefore, the scope of the invention is defined not by the detailed description of the invention but by the appended claims, and all differences within the scope will be construed as being included in the present invention. In the drawings, like reference numerals refer to like elements throughout.

A touch input device according to various embodiments of the present document, which is an electronic device, may include at least one of, e.g., a smartphone, a tablet personal computer (PC), a display device for a vehicle, a mobile phone, a video phone, an e-book reader, a laptop personal computer (laptop PC), a netbook computer, a mobile medical device, a camera, or a wearable device. Here, the wearable device may include at least one of an accessory type wearable device (e.g., a watch, a ring, a bracelet, an anklet, a necklace, glasses, a contact lens, or a head-mounted-device (HMD)), a textile or clothing integrated type wearable device (e.g., electronic clothing), a body attachment type wearable device (e.g., a skin pad or tattoo), or a bio-implantable type bio-implantable type (e.g., an implantable circuit).

FIG. 1 is a schematic view illustrating a touch sensor and a touch input device including same according to an embodiment of the present invention.

Referring to FIG. 1, a touch input device 1 according to an embodiment of the present invention may include a touch sensor 10, a sensing unit 11, a driving unit 12, and a control unit 13.

The driving unit 12 applies a driving signal (or TX signal) to the touch sensor 10 by control of the control unit 13, and the sensing unit 11 receives a sensing signal (or RX signal) received from the touch sensor 10.

The driving unit 12 may sequentially supply the driving signal to a plurality of driving electrodes of the touch sensor 10.

The sensing unit 11 receives a signal outputted from a plurality of reception electrodes of the touch sensor 10. Here, the signal may include information on capacitance variation between the driving electrode and the reception electrode, which are adjacent to each other, a low ground mass (LGM) noise signal, and a display noise signal.

The sensing unit 11 may subtract two signals among the signals outputted from the plurality of reception electrodes to output subtracted signals and perform analog-to-digital conversion on outputted subtracted signals to output converted signals. To this end, the sensing unit 11 may include a comparator and an ADC.

The control unit 13 may detect whether a touch is generated and/or a touch position based on the digital signal outputted from the sensing unit 11.

Although the sensing unit 11, the driving unit 12, and the control unit 13 are distinguished for convenience of description in FIG. 1, the embodiment of the present invention is not limited thereto. For example, at least one or two or more of the sensing unit 11, the driving unit 12, and the control unit 13 may be implemented as one module, unit, or chip, or the sensing unit 11, the driving unit 12, and the control unit 13 may be implemented as one module, unit, or chip.

The touch input device 1 in FIG. 1 may include a display panel. In this case, the touch sensor 10 may be disposed on the display panel or disposed in the display panel. Depending on cases, the touch sensor 10 may be disposed below the display panel. For example, the touch sensor 10 may be directly formed on an outer surface (e.g., a top surface of the upper substrate or a bottom surface of the lower substrate) or an inner surface (e.g., a bottom surface of the upper substrate or a top surface of the lower substrate) of an upper substrate and/or a lower substrate of the display panel. The touch sensor 10 may be coupled to the display panel to provide the touch screen.

The touch sensor 10 may include electrodes each having a predetermined shape, and the predetermined electrodes may include a plurality of driving electrodes TX0 to TXm and a plurality of reception electrodes RX0 to RXn.

A predetermined capacitance 14 C00, C01, C10, C11, . . . Cnm is formed between the plurality of driving electrodes TX0 to TXm and the plurality of reception electrodes RX0 to RXn, particularly at a crossing portion therebetween.

The sensing unit 11 may receive a sensing signal (or reception signal) including information on capacitance variation varied according to a touch to a touch surface from the driving unit 12 for applying a driving signal to the plurality of driving electrodes TX0 to TXm and the plurality of reception electrodes RX0 to RXn for an operation of the touch sensor 10.

Although the plurality of driving electrodes TX0 to TXm and the plurality of reception electrodes RX0 to RXn of the touch sensor 10 form an orthogonal array in FIG. 1, the embodiment of the present invention is not limited thereto. For example, the plurality of driving electrodes TX0 to TXm and the plurality of reception electrodes RX0 to RXn may have any number of dimensions including diagonal, concentric, and three-dimensional random arrangements and applied arrangements. Here, characters n and m that are positive integers may have the same value or different values and be varied in size according to embodiments.

The plurality of driving electrodes TX0 to TXm and the plurality of reception electrodes RX0 to RXn may be arranged to cross each other. The driving electrode TX may include the plurality of driving electrodes TX0 to TXm each extending in a first axial direction, and the reception electrode RX may include the plurality of reception electrodes RX0 to RXn each extending in a second axial direction crossing the first axial direction.

The plurality of driving electrodes TX0 to TXm and the plurality of reception electrodes RX0 to RXn may be formed on the same layer (one layer) or different double layers (two layers). A portion of the plurality of driving electrodes TX0 to TXm may be arranged on a layer different from the rest, and a portion of the plurality of reception electrodes RX0 to RXn may be arranged on a layer different from the rest. Alternatively, each of the plurality of driving electrodes TX0 to TXm and the plurality of reception electrodes RX0 to RXn may have a diamond pattern, circular, oval or polygonal shape.

Various embodiments of the touch sensor 10 according to an embodiment of the present invention will be described in detail with reference to the drawings below.

Figure 2:
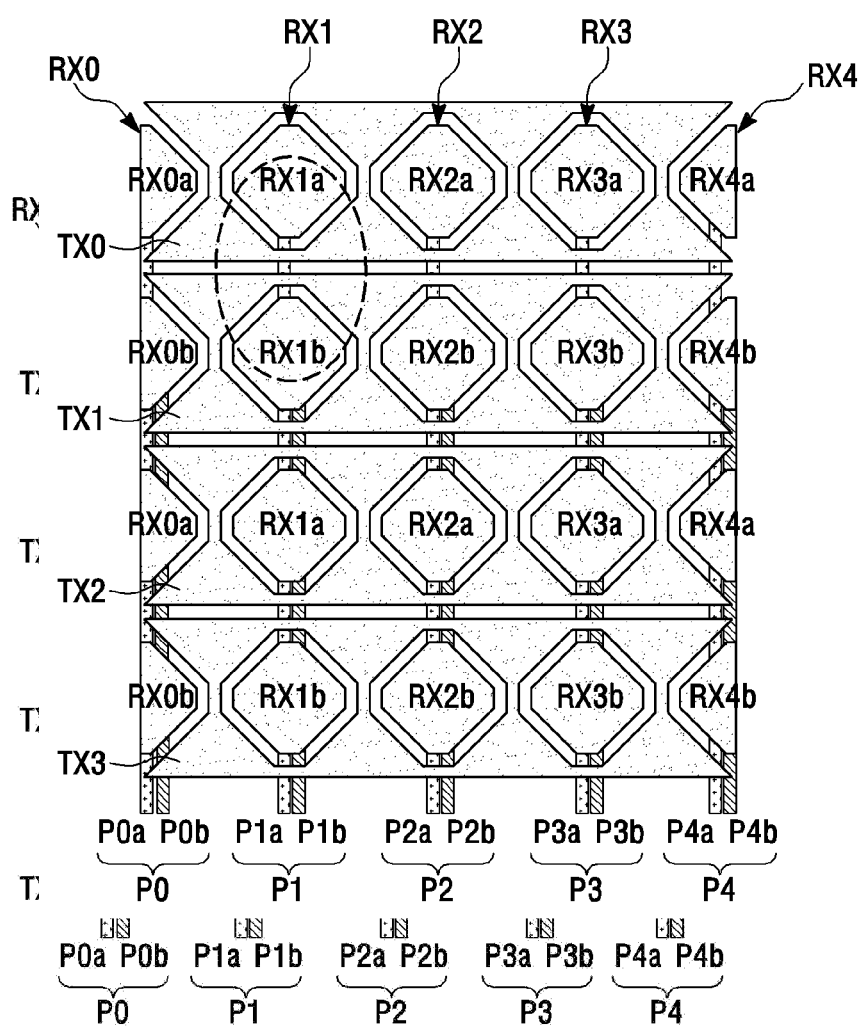
FIG. 2 is a plan view illustrating a portion of one embodiment of a touch sensor 10 in FIG. 1.
Figure 3:
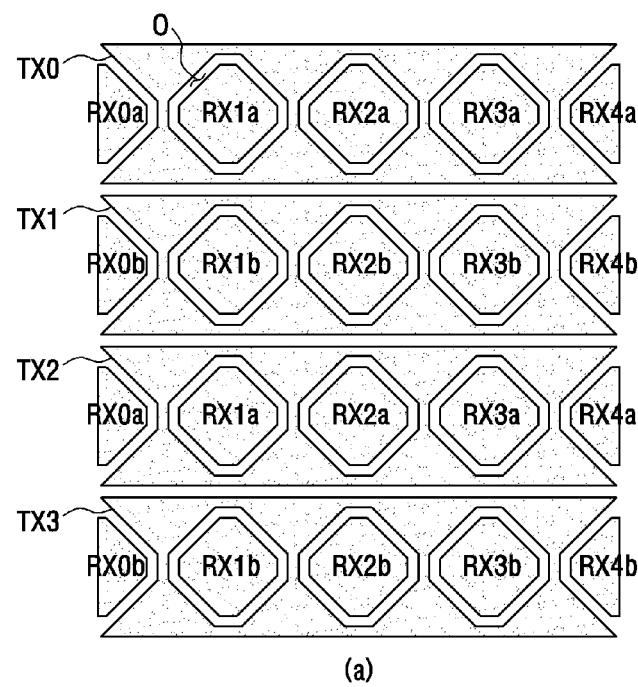
FIG. 3 is plan views illustrating a state in which the touch sensor in FIG. 2 is separated by layers.
Figure 3:
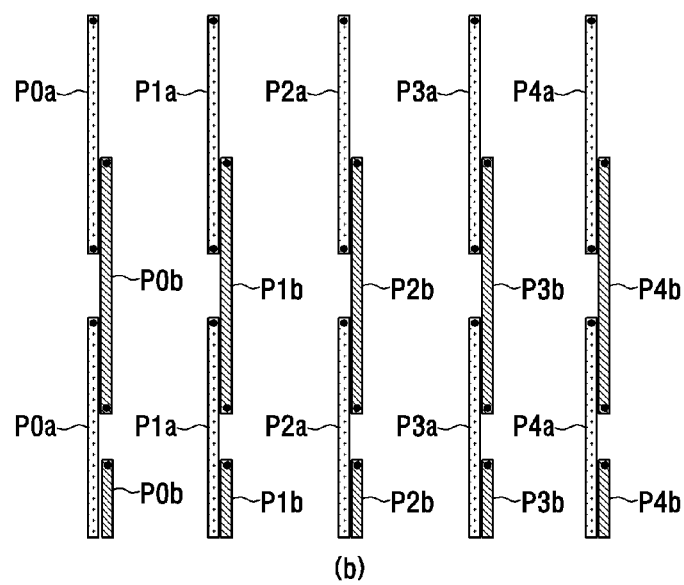
Figure 4:
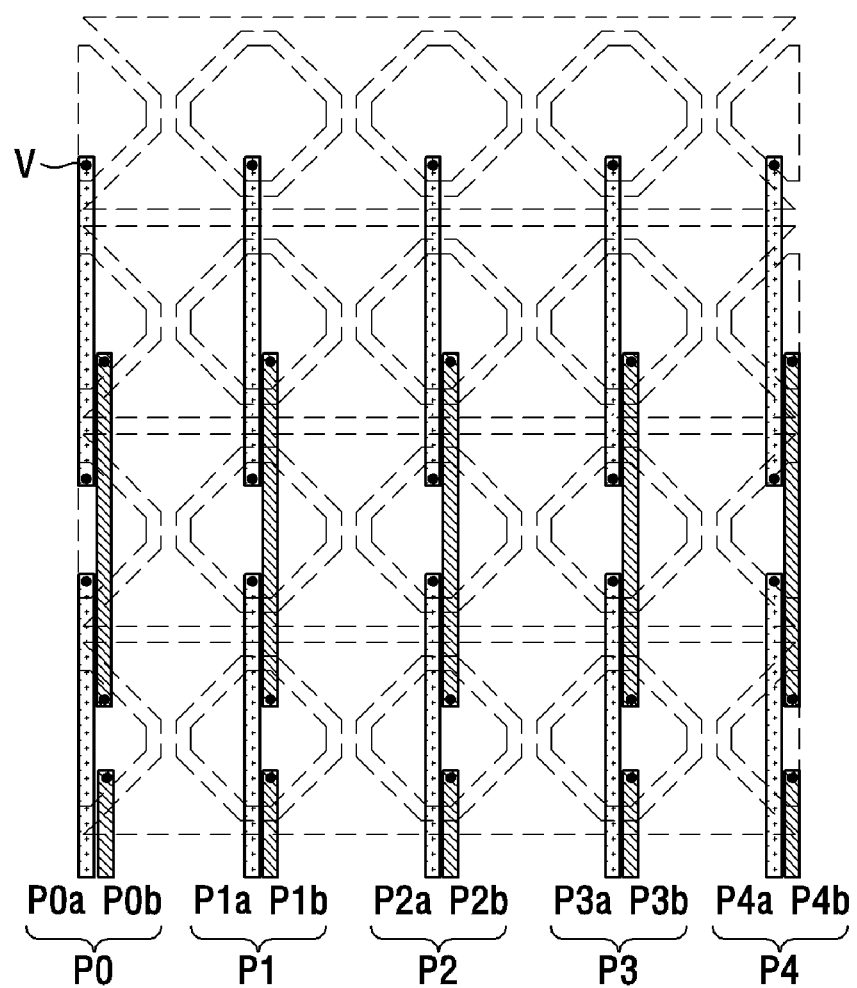
FIG. 4 is a view for explaining electrical connection of a plurality of reception electrodes in FIG. 2.

FIG. 2 is a plan view illustrating a portion of an embodiment of the touch sensor 10 in FIG. 1, FIG. 3 is plan views illustrating a state in which the touch sensor in FIG. 2 is separated by layers, and FIG. 4 is view for explaining electrical connection between the plurality of reception electrodes in FIG. 2.

Referring to FIGS. 2 to 4, the touch sensor according to an embodiment of the present invention may be disposed on a touch input area of the touch input device or a display area of the display panel contained in the touch input device.

The touch sensor according to an embodiment of the present invention may include the plurality of driving electrodes TX0, TX1, TX2, TX3, . . . and the plurality of reception electrodes RX0, RX1, RX2, RX3, RX4, . . . .

The plurality of driving electrodes TX0, TX1, TX2, TX3, . . . may include a 0-th driving electrode TX0, a first driving electrode TX1, a second driving electrode TX2, and a third driving electrode TX3.

The plurality of reception electrodes RX0, RX1, RX2, RX3, RX4, . . . may include a 0-th reception electrode RX0, a first reception electrode RX1, a second reception electrode RX2, a third reception electrode RX3, and a fourth reception electrode RX4.

The plurality of driving electrodes TX0, TX1, TX2, TX3, . . . may be arranged in a second direction (or vertical direction), and the plurality of reception electrodes RX0, RX1, RX2, RX3, RX4, . . . may be arranged in a first direction (or horizontal direction) perpendicular to the second direction. Here, the plurality of driving electrodes TX0, TX1, TX2, TX3, . . . may be arranged in the first direction (or horizontal direction), and the plurality of reception electrodes RX0, RX1, RX2, RX3, RX4, . . . may be arranged in the second direction (or vertical direction).

A predetermined capacitance may be formed between the plurality of driving electrodes TX0, TX1, TX2, TX3, . . . and the plurality of reception electrodes RX0, RX1, RX2, RX3, RX4, . . . . The capacitance is varied when a touch input is generated at a corresponding point or a surrounding thereof. Thus, whether a touch is generated or a touch input may be detected by detecting the capacitance variation from a signal outputted from the plurality of reception electrodes RX0, RX1, RX2, RX3, RX4, . . . .

As illustrated in (a) of FIG. 3, each of the plurality of driving electrodes TX0, TX1, TX2, TX3, . . . may have a rectangular pattern or bar pattern shape extending in the first direction and have, therein, a plurality of openings O arranged in the first direction.

One reception electrode is disposed in each opening O. Each opening O has a shape corresponding to that of the one reception electrode disposed therein. For example, as illustrated in FIG. 3, the rest except for openings arranged on left and right edges among the plurality of openings O may have a rhombus shape, and the openings arranged on the left and right edges may have a triangular shape. Although not shown in the drawings, each of all the openings O may have a rhombus shape. Each of the plurality of openings O may have various shapes such as a polygon, a rectangle, a circle or an oval.

Each of the reception electrodes RX0, RX1, RX2, RX3, RX4, . . . includes a plurality of reception electrode patterns RX0$a$, RX0$b$, RX1$a$, RX1$b$, RX2$a$, RX2$b$, RX3$a$, RX3$b$, RX4$a$, and RX4$b$ and connecting patterns P0, P1, P2, P3, and P4.

As illustrated in (a) of FIG. 3, the plurality of driving electrodes TX0, TX1, TX2, TX3, . . . and the plurality of reception electrode patterns RX0$a$, RX0$b$, RX1$a$, RX1$b$, RX2$a$, RX2$b$, RX3$a$, RX3$b$, RX4$a$, and RX4$b$ may be arranged on a first layer. Here, the plurality of driving electrodes TX0, TX1, TX2, TX3, . . . and the plurality of reception electrode patterns RX0$a$, RX0$b$, RX1$a$, RX1$b$, RX2$a$, RX2$b$, RX3$a$, RX3$b$, RX4$a$, and RX4$b$ arranged on the first layer may be implemented as a metal mesh. As illustrated in (b) of FIG. 3, a plurality of connecting patterns P0$a$, P0$b$, P1$a$, P1$b$, P2$a$, P2$b$, P3$a$, P3$b$, P4$a$, and P4$b$ may be arranged on a second layer. The second layer is different from the first layer of (a) of FIG. 3 and electrically insulated from the first layer. Here, the plurality of connecting patterns P0$a$, P0$b$, P1$a$, P1$b$, P2$a$, P2$b$, P3$a$, P3$b$, P4$a$, and P4$b$ may be implemented as a metal mesh. The first layer of (a) of FIG. 3 may be arranged on the second layer of (b) of FIG. 3, and vice versa.

The plurality of reception electrode patterns contained in each reception electrode may be divided into at least two groups. The other group of reception electrode patterns are alternately arranged one by one between one group of reception electrode patterns. The one group of reception electrode patterns are electrically isolated from the other group of reception electrode patterns. The plurality of connection patterns contained in each reception electrode include first connection patterns that electrically connect the one group of reception electrode patterns and second connection patterns that electrically connect the other group of reception electrode patterns.

For example, the 0-th reception electrode RX0 may include the plurality of reception electrode patterns RX0$a$ and RX0$b$ and the plurality of connection patterns P0. The plurality of reception electrode patterns RX0$a$ and RX0$b$ may include a first group of reception electrode patterns RX0$a$ and a second group of reception electrode patterns RX0$b$, which are alternately arranged one by one in the second direction. The first group of reception electrode patterns RX0$a$ and the second group of reception electrode patterns RX0$b$ may be electrically isolated from each other. The 0-th connection pattern P0 may include first connection patterns P0$a$ electrically connecting the first group of reception electrode patterns RX0$a$ and second connection patterns P0$b$ electrically connecting the second group of reception electrode patterns RX0$b$.

The first reception electrode RX1 may include the plurality of reception electrode patterns RX1$a$ and RX1$b$ and the plurality of connection patterns P1. The plurality of reception electrode patterns RX1$a$ and RX1$b$ may include a first group of reception electrode patterns RX1$a$ and a second group of reception electrode patterns RX1$b$, which are alternately arranged one by one in the second direction. The first group of reception electrode patterns RX1$a$ and the second group of reception electrode patterns RX1$b$ may be electrically isolated from each other. The first connection pattern P1 may include first connection patterns P1$a$ electrically connecting the first group of reception electrode patterns RX1$a$ and second connection patterns P1$b$ electrically connecting the second group of reception electrode patterns RX1$b$.

The second reception electrode RX2 may include the plurality of reception electrode patterns RX2$a$ and RX2$b$ and the plurality of connection patterns P2. The plurality of reception electrode patterns RX2$a$ and RX2$b$ may include a first group of reception electrode patterns RX2$a$ and a second group of reception electrode patterns RX2$b$, which are alternately arranged one by one in the second direction. The first group of reception electrode patterns RX2$a$ and the second group of reception electrode patterns RX2$b$ may be electrically isolated from each other. The second connection pattern P2 may include first connection patterns P2$a$ electrically connecting the first group of reception electrode patterns RX2$a$ and second connection patterns P2$b$ electrically connecting the second group of reception electrode patterns RX2$b$.

The third reception electrode RX3 may include the plurality of reception electrode patterns RX3$a$ and RX3$b$ and the plurality of connection patterns P3. The plurality of reception electrode patterns RX3$a$ and RX3$b$ may include a first group of reception electrode patterns RX3$a$ and a second group of reception electrode patterns RX3$b$, which are alternately arranged one by one in the second direction. The first group of reception electrode patterns RX3$a$ and the second group of reception electrode patterns RX3$b$ may be electrically isolated from each other. The third connection pattern P3 may include first connection patterns P3a electrically connecting the first group of reception electrode patterns RX3a and second connection patterns P3b electrically connecting the second group of reception electrode patterns RX3b.

The fourth reception electrode RX4 may include the plurality of reception electrode patterns RX4a and RX4b and the plurality of connection patterns P4. The plurality of reception electrode patterns RX4a and RX4b may include a first group of reception electrode patterns RX4a and a second group of reception electrode patterns RX4b, which are alternately arranged one by one in the second direction. The first group of reception electrode patterns RX4a and the second group of reception electrode patterns RX4b may be electrically isolated from each other. The fourth connection pattern P4 may include first connection patterns P4a electrically connecting the first group of reception electrode patterns RX4a and second connection patterns P4b electrically connecting the second group of reception electrode patterns RX4b.

The plurality of reception electrode patterns RX0a, RX0b, RX1a, RX1b, RX2a, RX2b, RX3a, RX3b, RX4a, and RX4b are arranged in the plurality of openings O of the plurality of driving electrodes TX0, TX1, TX2, TX3, . . . . One reception electrode pattern is arranged in one opening O. Each of the reception electrode patterns has a shape corresponding to that of the opening corresponding thereto.

In the random reception electrode RX1, a portion of the driving electrode TX0 directly adjacent to a periphery of the first group of reception electrode patterns RX1a and a portion of the driving electrode TX1 directly adjacent to a periphery of the second group of the reception electrode patterns RX1b are arranged together between the first group of reception electrode patterns RX1a and the second group of reception electrode patterns RX1b.

The random driving electrode TX0 is arranged directly adjacent to a periphery of one group of reception electrode patterns RX0a, RX1a, RX2a, RX3a, and RX4a, and another driving electrode TX1 arranged directly adjacent to a periphery of another group of reception electrode patterns RX0a, RX1a, RX2a, RX3a, and RX4a is separated from the one group of reception electrode patterns RX0a, RX1a, RX2a, RX3a, and RX4a by the random driving electrode TX0.

Each of the connection patterns P0a, P0b, P1a, P1b, P2a, P2b, P3a, P3b, P4a, and P4b may have a bar pattern shape extending along the second direction and include at least one conductive via v. The conductive via v may be arranged at both ends of each of the connection patterns.

In the 0-th reception electrode RX0, each of the first connection patterns P0a electrically connects two adjacent reception electrode patterns RX0a through the conductive via v among the first group of reception electrode patterns RX0a and is arranged below the second group of reception electrode patterns RX0b arranged between the two adjacent reception electrode patterns RX0a to overlap the second group of reception electrode patterns RX0b. Each of the second connection patterns P0b electrically connects two adjacent reception electrode patterns RX0b through the conductive via v among the second group of reception electrode patterns RX0b and is arranged below the first group of reception electrode patterns RX0a arranged between the two adjacent reception electrode patterns RX0b to overlap the first group of reception electrode patterns RX0a. The first connection patterns P1a, P2a, P3a, and P4a and the second connection patterns P1b, P2b, P3b, and P4b of the rest reception electrodes are arranged in the same manner as described above.

Hereinafter, an operation of a case in which a driving signal is applied to the plurality of driving electrodes TX0, TX1, TX2, and TX3 will be described in detail. For convenience of description, an operation of the first reception electrode RX1 and an operation of the sensing unit 11 in FIG. 1 will be described in detail.

When a driving signal is applied to the plurality of driving electrodes TX0, TX1, TX2, and TX3, two sensing signals are outputted through the first connection pattern P1. The first signal is outputted through the first connection pattern P1a, and the second signal is outputted through the second connection pattern P1b. Thus, two channels of first and second signals are outputted from each of the reception electrodes RX0, RX1, RX2, RX3, and RX4. The first and second signals are outputted at the same time from the sensing unit in FIG. 2.

Depending on the driving electrodes TX0, TX1, TX2, TX3, . . . to which a driving signal is applied, one of the first and second signals may be an active channel signal (or active reception signal (ARX)), and the other may be a dummy channel signal (or dummy reception signal (DRX)). Specifically, when a driving signal is applied to the driving electrodes TX0 and TX2 on which the first group of reception electrode patterns RX1a are arranged, the first signal outputted through the first connection pattern P1a is an active channel signal, and the second signal outputted through the second connection pattern P1b is a dummy channel signal. On the other hand, when a driving signal is applied to the driving electrodes TX1 and TX3 on which the second group of reception electrode patterns RX1b are arranged, the second signal outputted through the second connection pattern P1b is the active channel signal, and the first signal outputted through the first connection pattern P1a is the dummy channel signal.

For example, as illustrated in FIG. 2, when a driving signal is applied to the first driving electrode TX1 and an object (dotted line) approaches or contacts a crossing point of the first driving electrode TX1 and the first reception electrode RX1, a capacitance (or active capacitance) formed between the first driving electrode TX1 and the reception electrode pattern RX1b of the second group of the first reception electrodes RX1 is varied. The second signal including capacitance variation information, which is an active channel signal, is outputted through the second connection pattern P1b. Here, the second signal may include a LGM noise signal and a display noise signal caused by the display panel.

Also, a capacitance (or dummy capacitance) formed between the reception electrode patterns RX1a of the first group of the first reception electrodes is varied. The first signal including capacitance variation information, which is a dummy channel signal, is outputted through the first connection pattern P1a. Here, the first signal may include the LGM noise signal and the display noise signal caused by the display panel. Here, since the reception electrode pattern RX1b of the second group and the reception electrode pattern RX1a of the first group, which contact the object (dotted line), have the same cross-sectional area, almost the same or similar LGM noise signal may be inputted to each thereof, and almost the same display noise signal caused by the display panel may be also inputted.

The sensing unit 11 in FIG. 1 may cancel the LGM noise signal and the display noise signal inputted to the reception electrode pattern RX1a of the first group and the reception electrode pattern RX1b of the second group by subtracting the first signal outputted through the first connection pattern P1a from the second signal outputted through the second connection pattern P1*b*. Although the active capacitance variation contained, by the above subtraction, in the second signal that is the active channel signal is slightly reduced by the dummy capacitance variation contained in the first signal, since a distance between the first driving electrode TX1 and the reception electrode pattern RX1*a* is relatively greater than that between the first driving electrode TX1 and the reception electrode pattern RX1*b*, the dummy capacitance variation contained in the first signal is relatively less than the active capacitance variation contained in the second signal. Thus, whether a touch is generated and/or a touch position may be detected by the subtracted active capacitance variation.

On the other hand, when the 0-th driving electrode TX0 is applied instead of the first driving electrode TX1, the sensing unit 11 in FIG. 1 may cancel the LGM noise signal and the display noise signal inputted to the reception electrode pattern RX1*b* of the second group and the reception electrode pattern RX1*a* of the first group by subtracting the second signal (dummy channel signal) outputted through the connection pattern P1*b* from the first signal (active channel signal) outputted through the connection pattern P1*a* in a reverse manner. Thus, various noises generated during touch sensing such as the display noise and the LGM noise may be removed.

Figure 5:
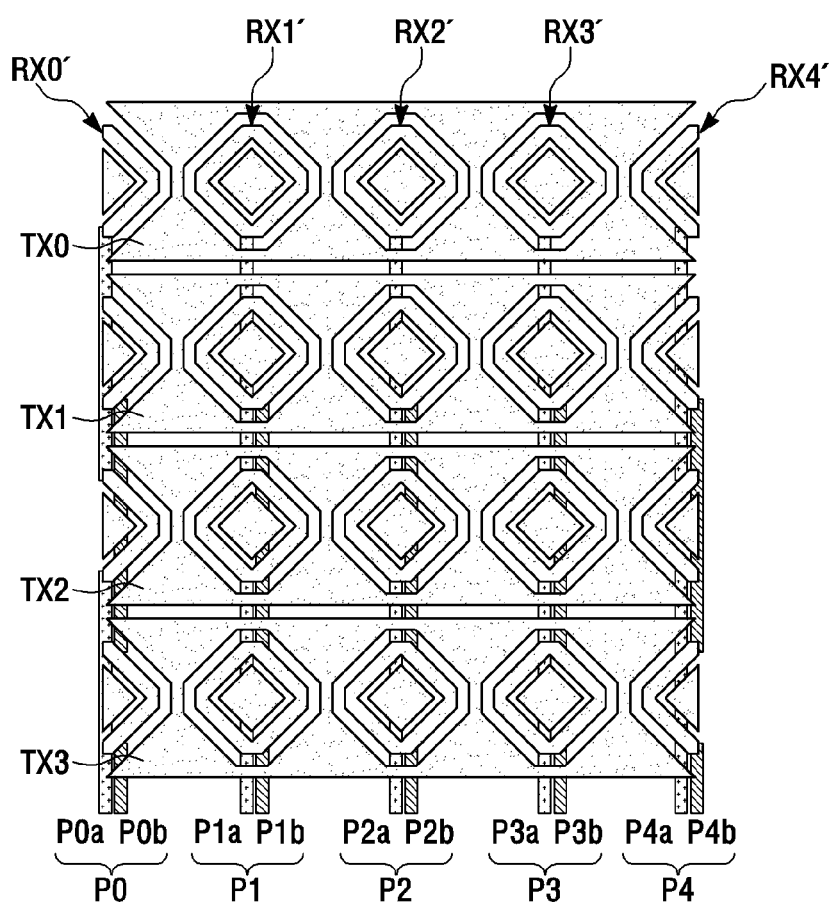
FIG. 5 is a plan view illustrating a portion of another embodiment of the touch sensor 10 in FIG. 1.
Figure 6:
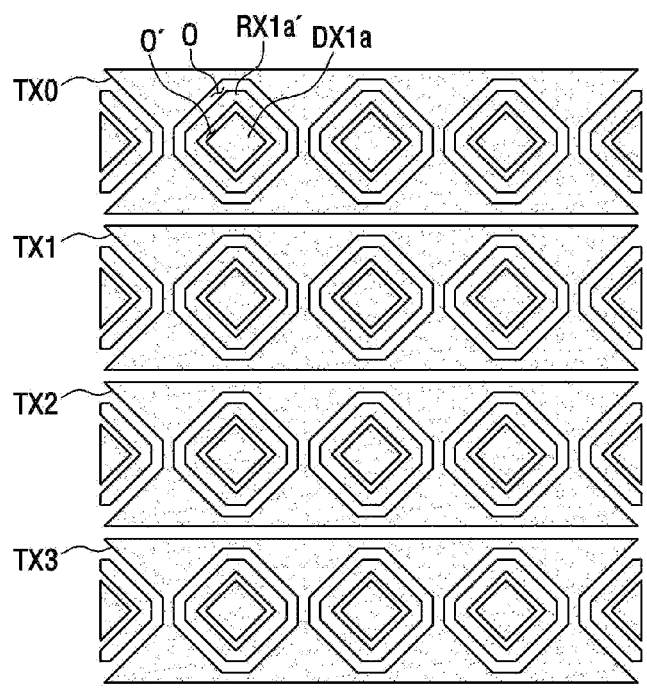
FIG. 6 is plan views illustrating a state in which the touch sensor in FIG. 5 is separated by layers.
Figure 6:
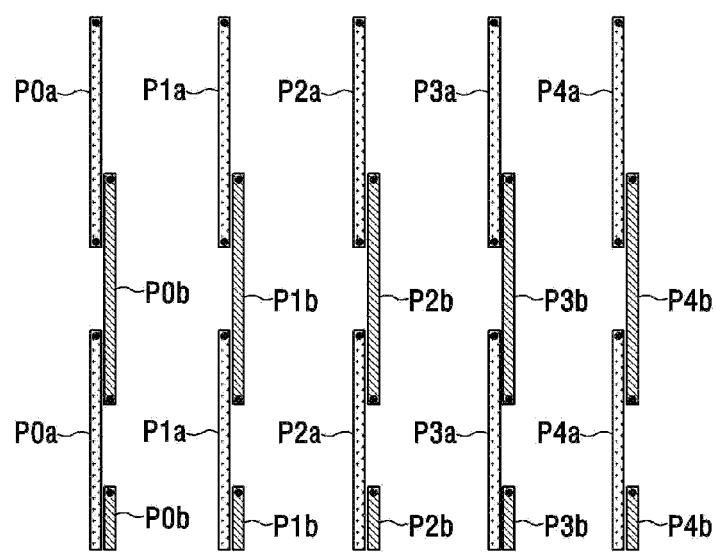
Figure 7:
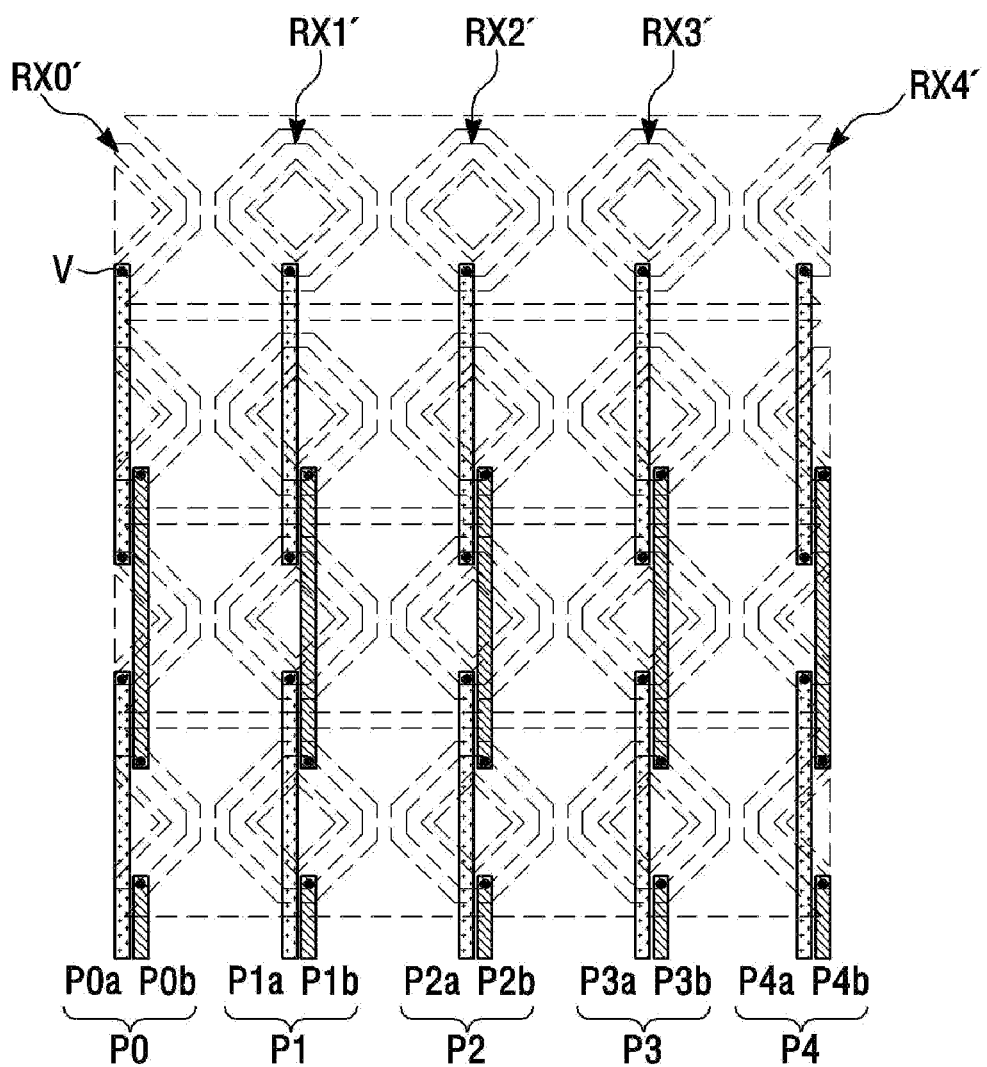
FIG. 7 is a view for explaining electrical connection of a plurality of reception electrodes in FIG. 5.

FIG. 5 is a plan view of a portion of another embodiment of the touch sensor 10 in FIG. 1, FIG. 6 is plan views illustrating a state in which the touch sensor in FIG. 5 is separated by layers, and FIG. 7 is view for explaining electrical connection between the plurality of receiving electrodes in FIG. 5.

The touch sensor in FIGS. 5 to 7 according to another embodiment of the present invention is different in a plurality of reception electrodes RX0', RX1', RX2', RX3', and RX4' from the touch sensor in FIGS. 2 to 4 according to an embodiment of the present invention. In particular, a plurality of reception electrode patterns RX1*a*' contained in each of the reception electrodes RX0', RX1', RX2', RX3', and RX4' have different structures. Hereinafter, the structures of the plurality of reception electrode patterns RX1*a*' will be described in detail, and descriptions of the rest components will be replaced with those described above.

Each of the plurality of reception electrode patterns RX1*a*' contained in each of the reception electrodes RX0', RX1', RX2', RX3', and RX4' includes an opening O' and a dummy pattern DX1*a* arranged in the opening O'. Here, the dummy pattern DX1*a* may have a shape corresponding to the opening O'.

The dummy pattern DX1*a* is not electrically connected to connection patterns P0*a*, P0*b*, P1*a*, P1*b*, P2*a*, P2*b*, P3*a*, P3*b*, P4*a*, and P4*b*. The dummy pattern DX1*a* maintains an electrically floating state.

An operation of the touch sensor in FIGS. 5 to 7 according to another embodiment of the present invention is the same as that of the touch sensor in FIGS. 2 to 4 according to an embodiment of the present invention. Thus, a touch input device including the touch sensor in FIGS. 5 and 7 according to another embodiment of the present invention has an advantage of removing various noises generated during touch sensing, e.g., the display noise and the LGM noise.

Figure 8:
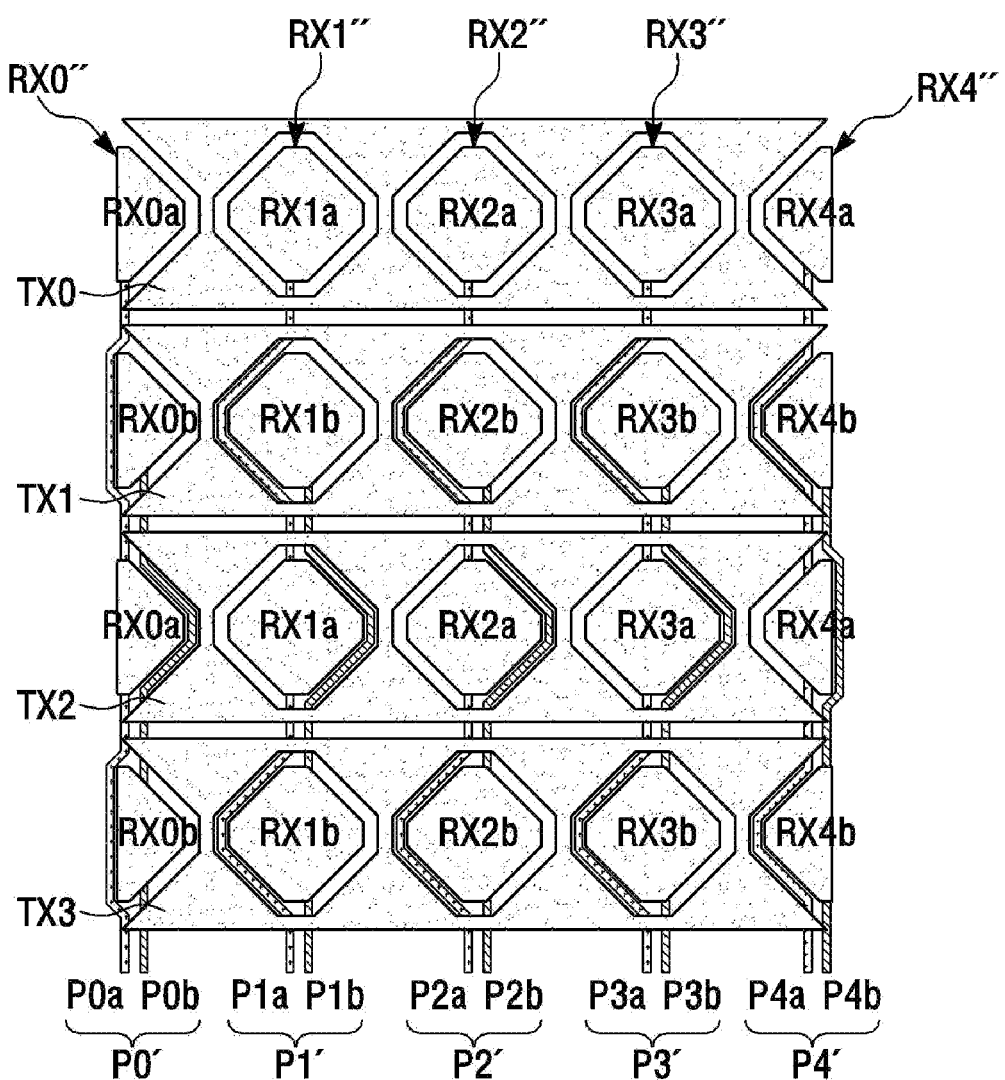
FIG. 8 is a plan view illustrating a portion of yet another embodiment of the touch sensor 10 in FIG. 1.
Figure 9:
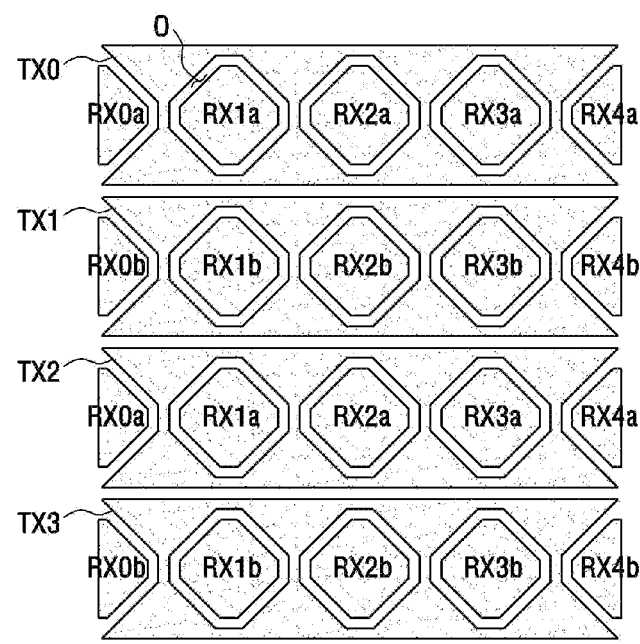
FIG. 9 is plan views illustrating a state in which the touch sensor in FIG. 8 is separated by layers.
Figure 9:
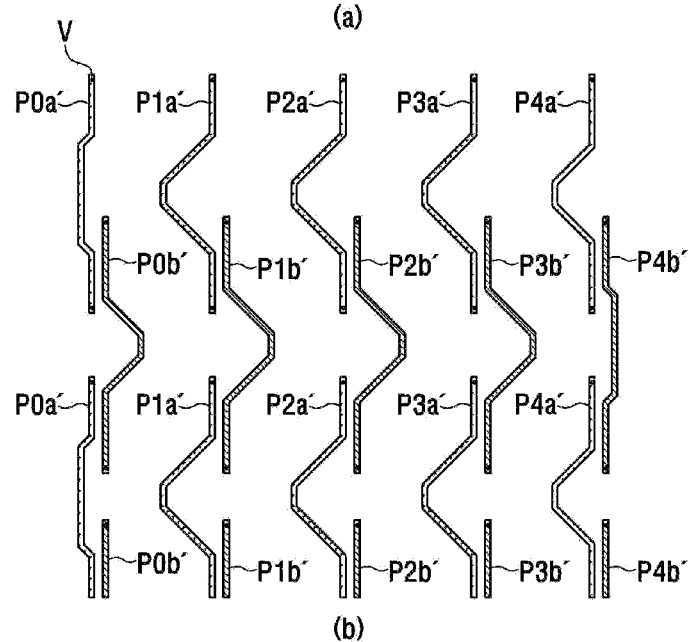

FIG. 8 is a plan view of a portion of yet another embodiment of the touch sensor 10 in FIG. 1, and FIG. 9 is plan views illustrating a state in which the touch sensor in FIG. 8 is separated by layers.

The touch sensor in FIGS. 8 to 9 according to yet another embodiment of the present invention is different in a plurality of reception electrodes RX0", RX1", RX2", RX3", and RX4" from the touch sensor in FIGS. 2 to 4 according to an embodiment of the present invention. In particular, a plurality of connection patterns P0', P1', P2', P3', and P4' contained in each of the reception electrodes RX0", RX1", RX2", RX3", and RX4" have different arrangement shapes. Hereinafter, the arrangement shapes of the connection patterns P0', P1', P2', P3', and P4' will be described in detail, and descriptions of the rest components will be replaced with those described above.

Each of the connection patterns P0', P1', P2', P3', and P4' includes first connection patterns P0*a*', P1*a*', P2*a*', P3*a*', and P4*a*' and second connection patterns P0*b*', P1*b*', P2*b*', P3*b*', and P4*b*'.

Each of the first connection patterns P0*a*', P1*a*', P2*a*', P3*a*', and P4*a*' electrically connects two of the first group of reception electrode patterns RX0*a*, RX1*a*, RX2*a*, RX3*a*, and RX4*a* so as not to overlap with the second group of reception electrode patterns RX0*b*, RX1*b*, RX2*b*, RX3*b*, and RX4*b* arranged between the two reception electrode patterns. For example, at least a portion of each of the first connection patterns P0*a*', P1*a*', P2*a*', P3*a*', and P4*a*' may be arranged between the second group of reception electrode patterns RX0*b*, RX1*b*, RX2*b*, and RX3*b* and the driving electrodes TX0, TX1, TX2, and TX3 arranged directly adjacent to the second group of reception electrode patterns RX0*b*, RX1*b*, RX2*b*, and RX3*b* so as not to overlap with the second group of the reception electrode patterns RX0*b*, RX1*b*, RX2*b*, RX3*b*, and RX4*b*. Also, the rest portion may be arranged to overlap the driving electrodes TX0, TX1, TX2, and TX3.

Each of the second connection patterns P0*b*', P1*b*', P2*b*', P3*b*', and P4*b*' electrically connects two of the second group of reception electrode patterns RX0*b*, RX1*b*, RX2*b*, RX3*b*, and RX4*b* so as not to overlap with the first group of reception electrode patterns RX0*a*, RX1*a*, RX2*a*, RX3*a*, and RX4*a* arranged between the two reception electrode patterns. For example, at least a portion of each of the second connection patterns P0*b*', P1*b*', P2*b*', P3*b*', and P4*b*' may be arranged between the first group of reception electrode patterns RX0*a*, RX1*a*, RX2*a*, RX3*a*, and RX4*a* and the driving electrodes TX0, TX1, TX2, and TX3 arranged directly adjacent to the first group of reception electrode patterns RX0*a*, RX1*a*, RX2*a*, RX3*a*, and RX4*a* so as not to overlap with the first group of reception electrode patterns RX0*a*, RX1*a*, RX2*a*, RX3*a*, and RX4*a*. Also, the rest portion may be arranged to overlap the driving electrodes TX0, TX1, TX2, and TX3.

The touch sensor according to yet another embodiment of the present invention may have an advantage of reducing a capacitance value between the first connection patterns and the second group of reception electrode patterns or between the second connection patterns and the first group of reception electrode patterns in comparison with the touch sensor in FIGS. 2 to 4 according to an embodiment of the present invention.

Also, although not shown in the drawings, the dummy pattern DX1*a* in FIGS. 5 and 6 may be applied to the touch sensor according to yet another embodiment of the present invention.

Figure 10:
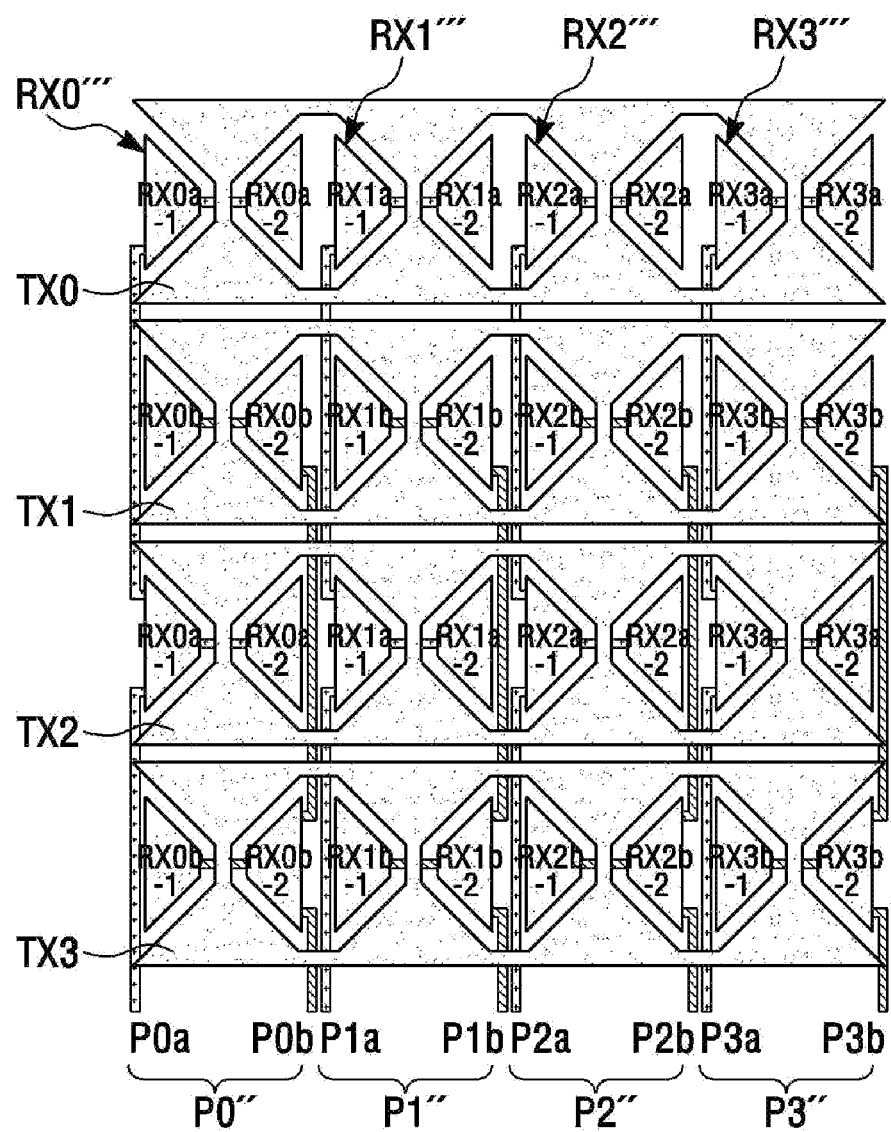
FIG. 10 is a plan view illustrating a portion of still another embodiment of the touch sensor 10 in FIG. 1.
Figure 11:
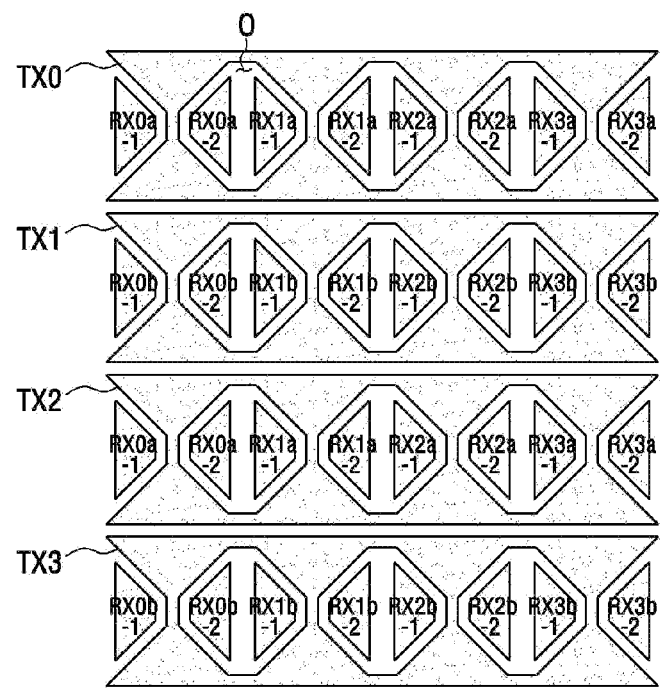
FIG. 11 is plan views illustrating a state in which the touch sensor in FIG. 10 is separated by layers.
Figure 11:
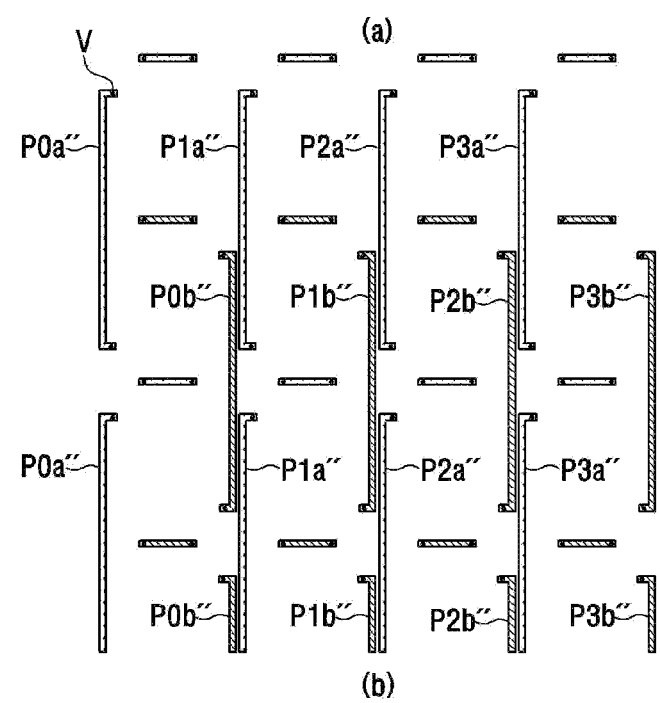

FIG. 10 is a plan view illustrating a portion of yet another embodiment of the touch sensor 10 in FIG. 1, and FIG. 11 is plan views illustrating a state in which the touch sensor in FIG. 10 is separated by layers.

The touch sensor according to still another embodiment of the present invention illustrated in FIGS. 10 to 11 is different in a plurality of reception electrodes RX0''', RX1''', RX2''', and RX3''' in comparison with the touch sensor in FIGS. 2 to 4 according to an embodiment of the present invention. In particular, a plurality of reception electrode patterns RX0a-1, RX0a-2, RX0b-1, RX0b-2, RX1a-1, RX1a-2, RX1b-1, RX1b-2, RX2a-1, RX2a-2, RX2b-1, RX2b-2, RX3a-1, RX3a-2, RX3b-1, and RX3b-2 and a plurality of connection patterns P0'', P1'', P2'', and P3'' contained in each of the reception electrodes RX0'', RX1'', RX2', RX3''' have different structures and arrangement shapes. Hereinafter, the structures and arrangement shapes of the reception electrode patterns RX0a-1, RX0a-2, RX0b-1, RX0b-2, RX1a-1, RX1a-2, RX1b-1, RX1b-2, RX2a-1, RX2a-2, RX2b-1, RX2b-2, RX3a-1, RX3a-2, RX3b-1, and RX3b-2 and the connection patterns P0'', P1'', P2'', and P3'' will be described in detail, and descriptions of the rest components will be replaced with those described above.

The plurality of reception electrode patterns RX0a-1, RX0a-2, RX0b-1, RX0b-2, RX1a-1, RX1a-2, RX1b-1, RX1b-2, RX2a-1, RX2a-2, RX2b-1, RX2b-2, RX3a-1, RX3a-2, RX3b-1, and RX3b-2 of each of the reception electrodes RX0'', RX1'', RX2'', and RX3'' include a first group of reception electrode patterns RX0a-1, RX0a-2, RX1a-1, RX1a-2, RX2a-1, RX2a-2, RX3a-1, and RX3a-2 and a second group of reception electrode patterns RX0b-1, RX0b-2, RX1b-1, RX1b-2, RX2b-1, RX2b-2, RX3b-1, and RX3b-2, which are alternately arranged one by one along the second direction. The first group of reception electrode patterns RX0a-1, RX0a-2, RX1a-1, RX1a-2, RX2a-1, RX2a-2, RX3a-1, and RX3a-2 and the second group of reception electrode patterns RX0b-1, RX0b-2, RX1b-1, RX1b-2, RX2b-1, RX2b-2, RX3b-1, and RX3b-2 may be electrically isolated from each other.

Each of the first group of reception electrode patterns RX0a-1, RX0a-2, RX1a-1, RX1a-2, RX2a-1, RX2a-2, RX3a-1, and RX3a-2 includes first reception electrode patterns RX0a-1, RX1a-1, RX2a-1, and RX3a-1 and second reception electrode patterns RX0a-2, RX1a-2, RX2a-2, and RX3a-2. The first reception electrode patterns RX0a-1, RX1a-1, RX2a-1, and RX3a-1 and the second reception electrode patterns RX0a-2, RX1a-2, RX2a-2, and RX3a-2 are arranged in two openings O adjacent to each other in the first direction in the corresponding driving electrodes TX0 and TX2, respectively. One first or second reception electrode pattern is arranged in the openings arranged at both side edges among a plurality of openings O of each of the driving electrodes TX0, TX1, TX2, and TX3, and the second reception electrode pattern of the first group of reception electrode patterns of one reception electrode and the first reception electrode pattern of the first group of reception electrode patterns of another reception electrode are arranged together in the rest openings while being spaced apart from each other among the plurality of reception electrodes RX0'', RX1'', RX2''', and RX3''.

Each of the connection patterns P0'', P1'', P2'', and P3'' includes first connection patterns P0a'', P1a'', P2a'', and P3a'' electrically connecting the first group of reception electrode patterns RX0a-1, RX0a-2, RX1a-1, RX1a-2, RX2a-1, RX2a-2, RX3a-1, and RX3a-2 and second connection patterns P0b'', P1b'', P2b'', and P3b'' electrically connecting the second group of reception electrode patterns RX0b-1, RX0b-2, RX1b-1, RX1b-2, RX2b-1, RX2b-2, RX3b-1, and RX3b-2.

Each of the first connection patterns P0a'', P1a'', P2a'', and P3a'' and the second connection patterns P0b'', P1b'', P2b'', and P3b'' are configured and arranged to connect two adjacent reception electrode patterns for each group with a minimum distance. For example, each of the first connection patterns P0a'', P1a'', P2a'', and P3a'' and the second connection patterns P0b'', P1b'', P2b'', and P3b'' may have one end connected to one side of a lower end of one of two adjacent reception electrode patterns of one group and the other end connected to one side of an upper end of the other reception electrode pattern. The rest portion except for the one end and the other end has a shape extending along the second direction and overlaps the opening O of the driving electrode with a maximum cross-sectional area instead of the reception electrode pattern of another group arranged between the one reception electrode pattern and the other reception electrode pattern.

Also, each of the first connection patterns P0a'', P1a'', P2a'', and P3a'' may further include a reception connection pattern electrically connecting the first reception electrode pattern and the second reception electrode pattern of the first group of reception electrode patterns, and each of the second connection patterns P0b'', P1b'', P2b'', and P3b'' may further include a reception connection pattern electrically connecting the first reception electrode pattern and the second reception electrode pattern of the second group of reception electrode patterns.

The touch sensor according to still another embodiment of the present invention may have an advantage of reducing a capacitance value between the first connection patterns and the second group of reception electrode patterns or between the second connection patterns and the first group of reception electrode patterns in comparison with the touch sensor in FIGS. 2 to 4 according to an embodiment of the present invention.

Although not shown in the drawings, the dummy pattern DX1a in FIGS. 5 and 6 may be applied to the touch sensor according to still another embodiment of the present invention.

Features, structures, and effects described in the above embodiments are incorporated into at least one embodiment of the present invention, but are not limited to only one embodiment. Moreover, features, structures, and effects exemplified in one embodiment can easily be combined and modified for another embodiment by those skilled in the art. Therefore, these combinations and modifications should be construed as falling within the scope of the present disclosure.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:
1. A touch sensor comprising:
a plurality of driving electrodes each having a shape extending in a first direction and having a plurality of openings arranged along the first direction; and
a plurality of reception electrodes comprising a plurality of reception electrode patterns arranged in the plurality of openings of the plurality of driving electrodes and a plurality of connection patterns arranged along a second direction different from the first direction to electrically connect the plurality of reception electrode patterns;

wherein the plurality of reception electrode patterns of at least one reception electrode among the plurality of reception electrodes comprise one group of reception electrode patterns and the other group of reception electrode patterns, which are electrically isolated from each other, the one group of reception electrode patterns and the other group of reception electrode patterns are alternately arranged one by one along the second direction, and the plurality of connection patterns of the at least one reception electrode comprise first connection patterns configured to electrically connect the one group of reception electrode patterns and second connection patterns configured to electrically connect the other group of reception electrode patterns.

2. The touch sensor of claim 1, wherein a first sensing signal is outputted through the first connection patterns, and a second sensing signal is outputted through the second connection patterns.

3. The touch sensor of claim 1, wherein a portion of the plurality of electrodes directly adjacent to a periphery of the one group of reception electrode patterns and a portion of the plurality of driving electrodes directly adjacent to a periphery of the other group of reception electrode patterns are arranged together between the one group of reception electrode patterns and the other group of reception electrode patterns, which are adjacent to each other.

4. The touch sensor of claim 1, wherein the plurality of driving electrodes arranged directly adjacent to a periphery of the other group of reception electrode patterns is separated from the one group of reception electrode patterns by the plurality of driving electrodes arranged directly adjacent to a periphery of the one group of reception electrode patterns.

5. The touch sensor of claim 1, wherein the first connection patterns are not in overlap with the other group of reception electrode patterns arranged between two reception electrode patterns connected by the first connection patterns.

6. The touch sensor of claim 1, wherein the reception electrode pattern comprises a dummy pattern arranged in the opening formed therein.

7. A touch sensor comprising:
a plurality of driving electrodes each having a shape extending in a first direction and having a plurality of openings arranged along the first direction; and
a plurality of reception electrodes comprising a plurality of reception electrode patterns arranged in the plurality of openings of the plurality of driving electrodes and a plurality of connection patterns arranged along a second direction different from the first direction to electrically connect the plurality of reception electrode patterns;
wherein the plurality of reception electrode patterns of at least one reception electrode among the plurality of reception electrodes comprise one group of reception electrode patterns and the other group of reception electrode patterns, which are electrically isolated from each other,
the one group of reception electrode patterns and the other group of reception electrode patterns are alternately arranged one by one along the second direction,
the reception electrode patterns comprise first reception electrode patterns and second reception electrode patterns, the first reception electrode patterns and the second reception electrode patterns are arranged in two adjacent openings among the plurality of openings of the driving electrode, respectively, the plurality of connection patterns of at least one reception electrode comprise first connection patterns configured to electrically connect the one group of reception electrode patterns and second connection patterns configured to electrically connect the other group of reception electrode patterns, and the first and second connection patterns further comprise a reception connection pattern configured to electrically connect the first reception electrode patterns and the second reception electrode patterns.

8. A touch input device comprising a touch sensor, a driving unit, and a sensing unit,
wherein the touch sensor comprises:
a plurality of driving electrodes each having a shape extending in a first direction and having a plurality of openings arranged along the first direction; and
a plurality of reception electrodes comprising a plurality of reception electrode patterns arranged in the plurality of openings of the plurality of driving electrodes and a plurality of connection patterns arranged along a second direction different from the first direction to electrically connect the plurality of reception electrode patterns,
wherein the driving unit provides a driving signal to the plurality of driving electrodes, and the sensing unit senses a plurality of sensing signals outputted through the plurality of connection patterns;
wherein the plurality of reception electrode patterns of at least one reception electrode among the plurality of reception electrodes comprise one group of reception electrode patterns and the other group of reception electrode patterns, which are electrically isolated from each other,
the one group of reception electrode patterns and the other group of reception electrode patterns are alternately arranged one by one along the second direction, and
the plurality of connection patterns of the at least one reception electrode comprise first connection patterns configured to electrically connect the one group of reception electrode patterns and second connection patterns configured to electrically connect the other group of reception electrode patterns.

9. The touch input device of claim 8, wherein a first sensing signal is outputted through the first connection patterns, and a second sensing signal is outputted through the second connection patterns, and
the sensing unit subtracts the first sensing signal and the second sensing signal to output subtracted signals.

10. The touch input device of claim 8, wherein a portion of the plurality of driving electrodes directly adjacent to a periphery of the one group of reception electrode patterns and a portion of the plurality of driving electrodes directly adjacent to a periphery of the other group of reception electrode patterns are arranged together between the one group of reception electrode patterns and the other group of reception electrode patterns, which are adjacent to each other.

11. The touch input device of claim 8, wherein the plurality of driving electrodes arranged directly adjacent to a periphery of the other group of reception electrode patterns is separated from the one group of reception electrode patterns by the plurality of driving electrodes arranged directly adjacent to a periphery of the one group of reception electrode patterns.

12. The touch input device of claim 8, wherein the first connection patterns are not in overlap with the other group of reception electrode patterns arranged between two reception electrode patterns connected by the first connection patterns.

13. The touch input device of claim 8, wherein the reception electrode pattern further comprises a dummy pattern arranged in the opening formed therein.

14. A touch input device comprising a touch sensor, a driving unit, and a sensing unit, wherein the touch sensor comprises:
- a plurality of driving electrodes each having a shape extending in a first direction and having a plurality of openings arranged along the first direction; and
- a plurality of reception electrodes comprising a plurality of reception electrode patterns arranged in the plurality of openings of the plurality of driving electrodes and a plurality of connection patterns arranged along a second direction different from the first direction to electrically connect the plurality of reception electrode patterns,
- wherein the driving unit provides a driving signal to the plurality of driving electrodes, and the sensing unit senses a plurality of sensing signals outputted through the plurality of connection patterns;

wherein the plurality of reception electrode patterns of at least one reception electrode among the plurality of reception electrodes comprise one group of reception electrode patterns and the other group of reception electrode patterns, which are electrically isolated from each other, the one group of reception electrode patterns and the other group of reception electrode patterns are alternately arranged one by one along the second direction, the reception electrode patterns comprise first reception electrode patterns and second reception electrode patterns, the first reception electrode patterns and the second reception electrode patterns are arranged in two adjacent openings among the plurality of openings of the driving electrode, respectively, the plurality of connection patterns of at least one reception electrode comprise first connection patterns configured to electrically connect the one group of reception electrode patterns and second connection patterns configured to electrically connect the other group of reception electrode patterns, and the first and second connection patterns further comprise a reception connection pattern configured to electrically connect the first reception electrode patterns and the second reception electrode patterns.

* * * * *